(12) United States Patent
Shen et al.

(10) Patent No.: US 9,669,650 B2
(45) Date of Patent: Jun. 6, 2017

(54) STRUCTURE OF WHITEBOARD

(71) Applicant: MILLENNIUM TECHNOLOGY ENTERPRISE (SHENZHEN) CO., LTD., Guangdong (CN)

(72) Inventors: Qian-Xin Shen, Guangdong (CN); Ye-Jun Xiao, Guangdong (CN)

(73) Assignee: LONG YOUNG TECHNOLOGY CO., LTD., Guangdong (CN)

( * ) Notice: Subject to any disclaimer, the term of this patent is extended or adjusted under 35 U.S.C. 154(b) by 173 days.

(21) Appl. No.: 14/408,960

(22) PCT Filed: Jun. 6, 2014

(86) PCT No.: PCT/CN2014/079379
§ 371 (c)(1),
(2) Date: Dec. 18, 2014

(87) PCT Pub. No.: WO2105/090015
PCT Pub. Date: Jun. 25, 2015

(65) Prior Publication Data
US 2016/0271998 A1    Sep. 22, 2016

(30) Foreign Application Priority Data
Dec. 18, 2013 (CN) .................... 2013 2 0835397 U

(51) Int. Cl.
*B43L 1/00*  (2006.01)
*B43L 5/00*  (2006.01)
*G09B 5/02*  (2006.01)

(52) U.S. Cl.
CPC .... *B43L 5/00* (2013.01); *B43L 1/00* (2013.01); *G09B 5/02* (2013.01)

(58) Field of Classification Search
USPC ....... 434/408, 413, 421, 422, 423, 425, 428, 434/430
See application file for complete search history.

(56) References Cited

U.S. PATENT DOCUMENTS 5,176,522 A * 1/1993 Robertson, Jr. ........... B43L 1/00
434/408
5,397,091 A * 3/1995 Tsuar ........................ B43L 1/04
16/374

(Continued)

*Primary Examiner* — Kurt Fernstrom
(74) *Attorney, Agent, or Firm* — CKC & Partners Co., Ltd.

(57) ABSTRACT

A whiteboard comprises a panel, four rims and four connectors. The panel comprises a writable pre-coating layer, a foaming layer and a back plate. The each rim comprises a rim main body and a number of locking pieces. The rim main body comprises a top plate, a light filter plate, an upper plate, a side plate. The light filter plate is connected between the top plate and the upper plate by melting. An inserting plate is vertically extended outwards from the side plate. A locking plate is vertically extended downwards from the rear end of the inserting plate. The locking pieces are locked at the lower ends of the locking plates. Each of the locking pieces comprises a connecting portion at the upper position thereof. A supporting portion is formed at the lower end of the connecting portion. The each connector comprises a bottom casing and a top casing. The bottom casing comprises a bottom casing main body. The top casing comprises a top cover. A lateral plate is downwards bent and extended from the outer edge of the top cover. A sealing strip is pasted at the position of the inner edge of the sealing strip contacting the writable pre-coating layer.

5 Claims, 4 Drawing Sheets

(56) References Cited

U.S. PATENT DOCUMENTS

| | | | | |
|---|---|---|---|---|
| 5,727,952 | A * | 3/1998 | Schenck | B43L 1/06 434/408 |
| 5,987,825 | A * | 11/1999 | Rosen | G09F 15/0068 40/107 |
| D465,522 | S * | 11/2002 | Beno | D19/113 |
| 6,817,124 | B1 * | 11/2004 | Ko | G09F 11/18 40/471 |
| 7,249,745 | B2 * | 7/2007 | Moore | B43L 1/00 108/27 |
| 7,293,993 | B2 * | 11/2007 | Fedorov | G09F 7/04 434/408 |
| 7,632,103 | B2 * | 12/2009 | Williams | B43L 1/06 434/408 |
| D669,534 | S * | 10/2012 | Nakashima | D19/113 |
| 8,454,370 | B2 * | 6/2013 | Hagan | B43L 1/002 434/408 |
| 8,634,277 | B2 * | 1/2014 | Hoch | G09D 3/12 368/29 |
| 2005/0066560 | A1 * | 3/2005 | Ternovits | G09F 15/0012 40/606.19 |

* cited by examiner

STRUCTURE OF WHITEBOARD

CROSS-REFERENCE TO RELATED APPLICATION

This application is a continuation of International application No. PCT/CN2014/079379, filed on Jun. 6, 2014 which claims the benefits of priority of CN application No. 201320835397.7 filed on Dec. 18, 2013, the content of which are incorporated herein by reference.

FIELD OF THE PRESENT INVENTION

The present invention relates to a kind of electronic board, which is generally used in classrooms.

BACKGROUND OF THE PRESENT INVENTION

At present, in many classrooms, traditional blackboards are used yet. Teachers use chalks to write on the blackboards. The chalk dust will be harmful to the health of teachers and students. Otherwise, the writing speed is too slow to reduce the studying efficiency.

In a few classrooms, both an electronic board and a traditional blackboard are used at same time. The electronic board overlaps in front of the blackboard, or the electronic board is hidden behind a door. That is not convenient for using, and influences the writing of teachers, and soils the classroom, and also brings some dangers to teachers and students. If the rims and the connectors are made of aluminium profile and aluminium casting, the board will be very heavy in weight, and increase materials consumption, energy consumption and carbon emission, and cannot be waterproof, and will be not safe. This kinds of above-mentioned boards can not meet the requirements of the boards of college, high school and primary school.

SUMMARY OF THE PRESENT INVENTION

The technical problem that the present invention needs to overcome the defect that traditional electronic whiteboard is very heavy in weight and cannot be waterproof, then to provide an electronic board with stable structure, and its shape will not change under using environment, with the functions of anti-water and anti-dust and safety in use.

In order to solve the technical problem, the present invention puts forward the following technical solution:

An electronic board comprises a panel, four rims and four connectors.

The panel is a rectangle. The panel comprises a writable pre-coating layer located on top thereof, a foaming layer located in the middle thereof and a back plate located on bottom thereof. A number of square holes are bored in a row at the edge of the back plate.

The each rim of the four rims has the same structure. The each rim comprises a rim main body and a number of locking pieces.

The rim main body comprises a top plate, a light filter plate, an upper plate, a side plate and a number of locking holes.

The upper plate is under the top plate.

The light filter plate is connected between the end of the top plate and the end of the upper plate by melting.

The side plate and the upper plate are vertical. An inserting plate is vertically extended outwards from the side plate.

A number of barbed bars are extended from the distal end of the inserting plate.

A locking plate is vertically extended downwards from the rear end of the inserting plate. A number of toothed bars are extended from the locking plate.

The locking pieces are locked at the lower ends of the locking plates. The each locking piece comprises a connecting portion at the upper position thereof. The connecting portion is hollow. A number of toothed grooves are defined on the inner wall of the connecting portion. A supporting portion is formed at the lower end of the connecting portion.

The each connector of the four connectors has the same structure. The each connector comprises a bottom casing and a top casing.

The bottom casing comprises a bottom casing main body. A first linking portion is located at one side of the bottom casing main body. A first fixing plate is vertically extended upwards from the edge of the first linking portion. A number of first screw holes are bored on the first fixing plate, which are corresponding to the locking holes of the rim.

A second linking portion is located at the other site of the bottom casing main body. A second fixing plate is vertically extended upwards from the edge of the second linking portion. A number of second screw holes are bored on the second fixing plate, which are corresponding to the locking holes of the rim.

The top casing comprises a top cover. A lateral plate is downwards bent and extended from the outer edge of the top cover. A sealing strip is pasted at the position of the inner edge of the sealing strip contacting the writable pre-coating layer.

The further improvement of the technical solution is: the foaming layer is a layer of the XPS foam board with high strength.

The further improvement of the technical solution is: the back plate is a layer of galvanized steel board.

The further improvement of the technical solution is: the end of the top plate, the light filter plate and the end of the upper plate are formed as a single body in one step by high temperature melting.

The further improvement of the technical solution is: two protruding lugs are vertically extended from the side plate, and a slot is located between the two protruding lugs.

The electronic board in accordance with the present invention has many advantages than prior arts.

1. The top plate and the light filter plate, and the upper plate are formed respectively with two different kinds of high polymer materials in one step by high temperature melting. Therefore, the top plate, the light filter plate and the upper plate have been formed a single body, so that structure not only meets the requirement of anti-water but also enhances the stability.

2. A sealing strip is pasted at the position of the inner edge of the sealing strip contacting the writable pre-coating layer, for the purpose of anti-water and anti-dust.

3. The inserting plates are inserted into the foaming layer, and the locking plates and the locking pieces cooperate to lock the back plate, thus the four rims are stably fixed to the panel. The electronic board is stable in the assembly circumstance, and its structure is stable, and its shape will not change under using environment.

4. The electronic board produced in accordance with the present invention is light in weight, and reduces materials consumption, and has a stable structure, and can cost down the production cost. The electronic board also has the advantages of anti-water and anti-dust and safety in use. The electronic board can be used in the environments of college, high school and primary school, and can meet the requirement of the board in the Future Classroom in the information age.

DESCRIPTION OF THE PREFERRED EMBODIMENT

Figure 1:
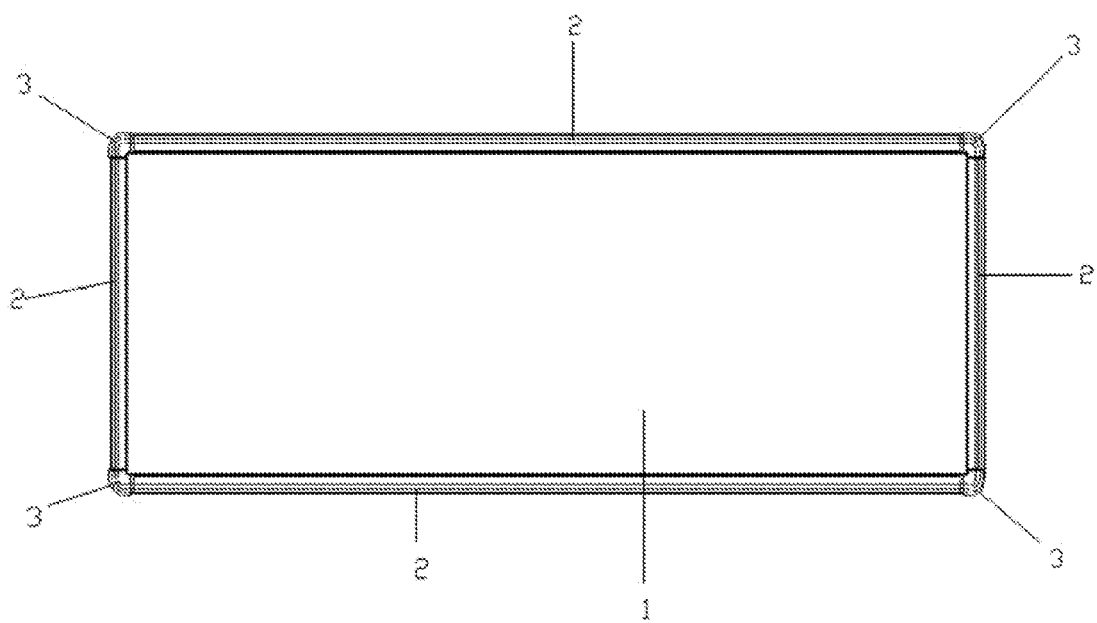
FIG. 1 is a schematic drawing of the electronic board in accordance with the present invention.
Figure 2:
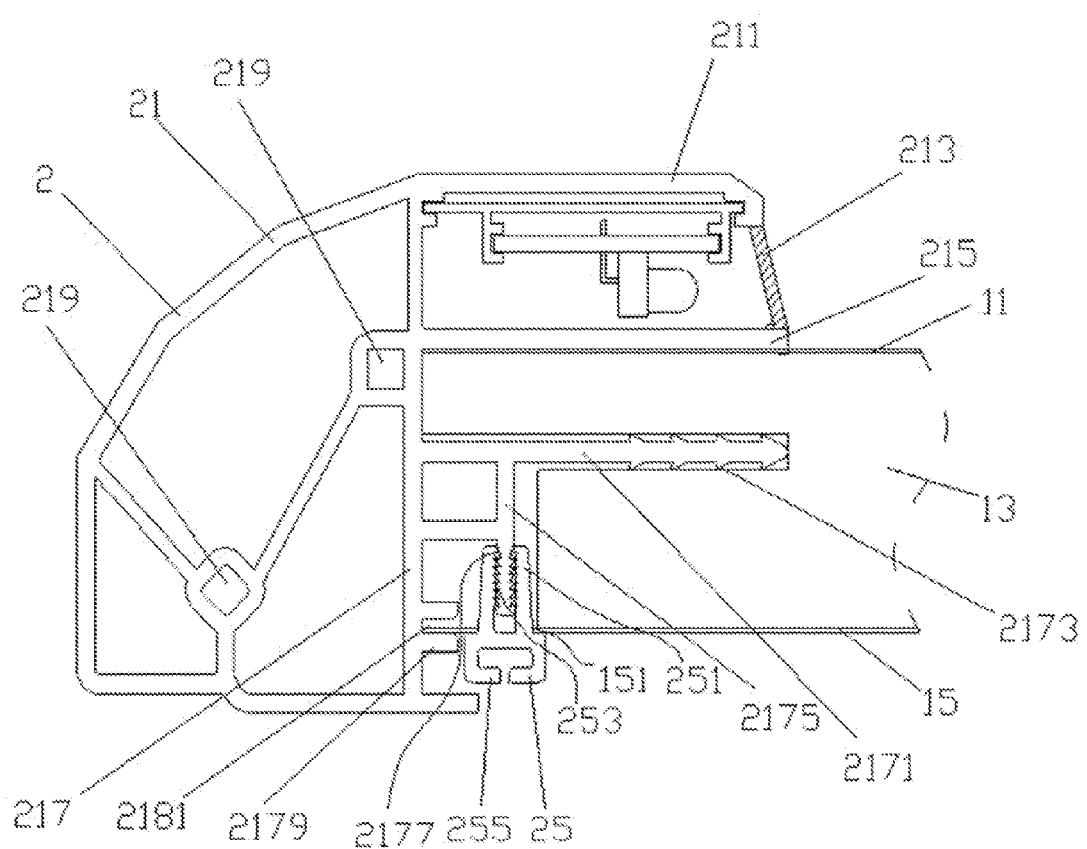
FIG. 2 is a schematic drawing of the panel and the rim.
Figure 3:
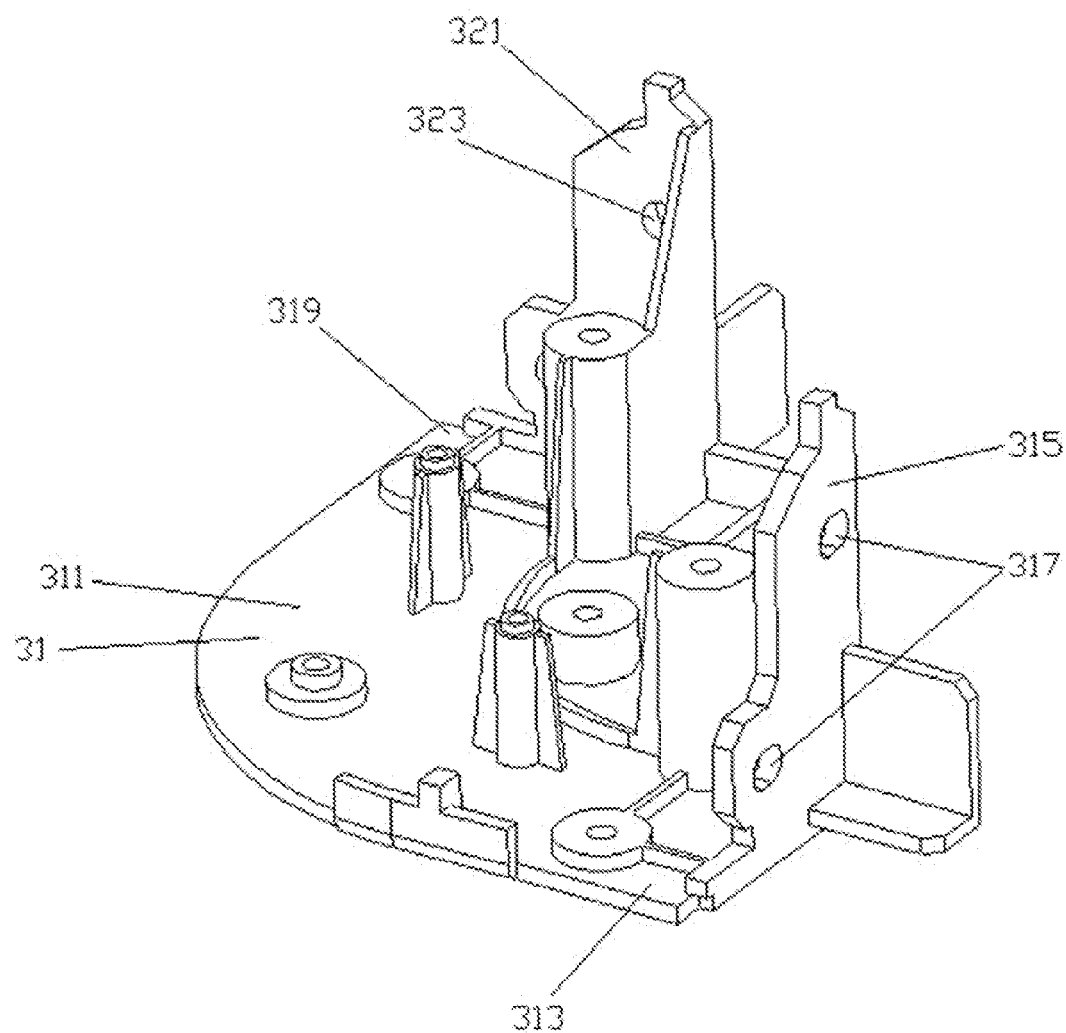
FIG. 3 is a stereogram view of the bottom casing.
Figure 4:
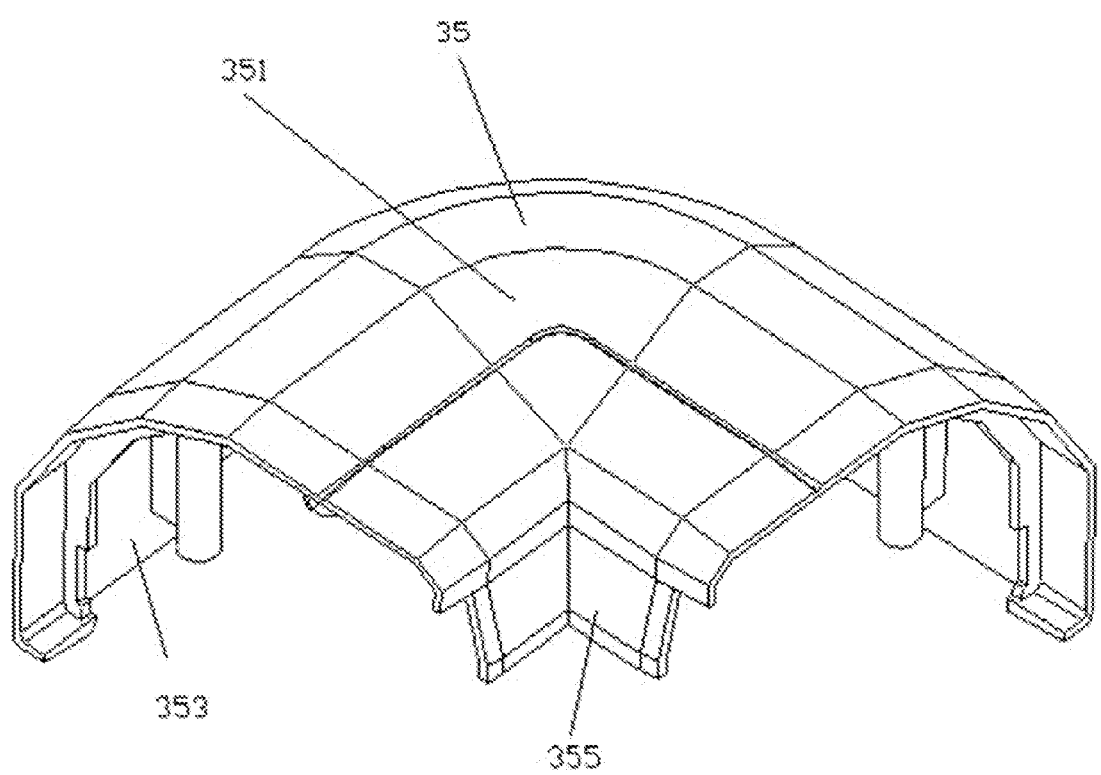
FIG. 4 is a stereogram view of the top casing.

As shown in FIG. 1 to FIG. 4, the first embodiment of the electronic board in accordance with the present invention comprises a panel 1, four rims 2 and four connectors 3.

The panel 1 is a rectangle.

The panel 1 comprises a writable pre-coating layer 11 located on top thereof, a foaming layer 13 located in the middle thereof and a back plate 15 located on bottom thereof.

The foaming layer 13 is a layer of the XPS foam board with high strength.

The back plate 15 is a layer of galvanized steel board.

A number of square holes 151 are bored in a row at the edge of the back plate 15.

The writable pre-coating layer 11 and the foaming layer 13 are tightly stuck by pasting some adhesive between just mentioned two layers.

The foaming layer 13 and the back plate 15 are tightly stuck by pasting some adhesive between just mentioned two layers.

The each rim 2 of the four rims 2 has the same structure. The four rims 2 are made of high polymer material. The each rim 2 basically shows linear shape.

The each rim 2 comprises a rim main body 21 and a number of locking pieces 25.

The rim main body 21 comprises a top plate 211, a light filter plate 213, an upper plate 215, a side plate 217 and two locking holes 219.

The upper plate 215 is under the top plate 211.

The light filter plate 213 is connected between the end of the top plate 211 and the end of the upper plate 215.

The top plate 211 and the light filter plate 213, and the upper plate 215 are formed respectively with two differ kinds of high polymer materials in one step by high temperature melting. Therefore, the top plate 211, the light filter plate 213 and the upper plate 215 has been formed a single body, so that structure not only meets the requirement of anti-water but also enhances the stability. The material of the light filter plate 23 also is able to meet the requirement of permitting the infrared light to pass through.

The side plate 217 and the upper plate 215 are vertical.

An inserting plate 2171 is vertically extended outwards from the side plate 217.

A number of barbed bars 2173 are extended from the distal end of the inserting plate 2171.

A locking plate 2175 is vertically extended downwards from the rear end of the inserting plate 2171. A number of toothed bars 2177 are extended from the locking plate 2175.

Two protruding lugs 2179 are vertically extended from the side plate 217. A slot 2181 is located between the two protruding lugs 2179.

The locking pieces 25 are locked at the lower ends of the locking plates 2175.

The each locking piece 25 comprises a connecting portion 251 at the upper position thereof.

The connecting portion 251 is hollow.

A number of toothed grooves 253 are defined on the inner wall of the connecting portion 251.

A supporting portion 255 is formed at the lower end of the connecting portion 251. The size of the supporting portion 255 is slightly larger than the size of the connecting portion 251.

The toothed bars 2177 of the locking plates 2175 of the rims 2 are hooked into the toothed grooves 253 of the connecting portions 251 of the locking pieces 25, so the locking pieces 25 are locked to the locking plate 2175.

The each connector 3 of the four connectors 3 has the same structure. The four connectors 3 are made of high polymer material.

The each connector 3 comprises a bottom casing 31 and a top casing 35.

The bottom casing 31 comprises a bottom casing main body 311.

A first linking portion 313 is located at one side of the bottom casing main body 311. A first fixing plate 315 is vertically extended upwards from the edge of the first linking portion 313. Two first screw holes 317 are bored on the first fixing plate 315, which are corresponding to the two locking holes 219 of the rim 2.

A second linking portion 319 is located at the other side of the bottom casing main body 311. A second fixing plate 321 is vertically extended upwards from the edge of the second linking portion 319. Two second screw holes 323 are bored on the second fixing plate 321, which are corresponding to the two locking holes 219 of the rim 2.

The top casing 35 comprises a top cover 351.

A lateral plate 353 is downwards bent and extended from the outer edge of the top cover 351.

A sealing strip 355 is pasted at the position of the inner edge of the sealing strip 355 contacting the writable pre-coating layer 11, for the purpose of anti-water and anti-dust.

The inserting plates 2171 are inserted into the foaming layer 13, thus the four rims 2 and the panel 1 are difficult to separate, because the barbed bars 2173 of the inserting plates 2171 pierce into and hook the panel 1. The writable pre-coating layer 11 presses the upper plates 215, at the same time, the back plate 15 is inserted into the slots 2181, then the locking pieces 25 are inserted through the square holes 151 of the back plate 15 to hook to the locking plates 2175 of the four rims 2. The supporting portions 255 of the locking pieces 25 support the back plate 15, thus the four rims 2 are stably fixed to the panel 1. After the four rims 2 all are fixed to the panel 1, the each connector 3 is put between two neighboring rims 2, after using self-tapping screws (not shown in Figs) to insert through the two first screw holes 317 and the two second screw holes 323, then the self-tapping screws are locked in the locking holes 219 of the rim 2, thus the four connectors 3 and the four rims 2 can be connected to become an annular integral structure. The four connectors 3 are fixed at the four corners of the panel 1. At last, the top casings 35 are fixed.

The electronic board in accordance with the present invention has many advantages than prior arts.

1. The top plate 211 and the light filter plate 213, and the upper plate 215 are formed respectively with two different kinds of high polymer materials in one step by high temperature melting. Therefore, the top plate 211, the light filter plate 213 and the upper plate 215 have been formed a single body, so that structure not only meets the requirement of anti-water but also enhances the stability.

2. A sealing strip 355 is pasted at the position of the inner edge of the sealing strip 355 contacting the writable pre-coating layer 11, for the purpose of anti-water and anti-dust.

3. The inserting plates 2171 are inserted into the foaming layer 13, and the locking plates 2175 and the locking pieces 25 cooperate to lock the back plate 15, thus the four rims 2 are stably fixed to the panel 1. The electronic board is stable in the assembly circumstance, and its structure is stable, and its shape will not change under using environment.

4. The electronic board produced in accordance with the present invention is light in weight, and reduces materials consumption, and has a stable structure, and can cost down the production cost. The electronic board also has the advantages of anti-water and anti-dust and safety in use. The electronic board can be used in the environments of college, high school and primary school, and can meet the requirement of the board in the Future Classroom in the information age.

What is claimed is:

1. A whiteboard comprising:
   a panel;
   four rims;
   four connectors;
   said panel being a rectangle;
   said panel comprising a writable pre-coating layer located on top thereof, a foaming layer located in the middle thereof and a back plate located on bottom thereof;
   a number of square holes being bored in a row at the edge of the back plate;
   said each rim of the four rims having the same structure;
   said each rim comprising a rim main body and a number of locking pieces;
   said rim main body comprising a top plate, a light filter plate, an upper plate, a side plate and a number of locking holes;
   said upper plate being under the top plate;
   said light filter plate being connected between an end of the top plate and an end of the upper plate by melting;
   said side plate and the upper plate being vertical;
   an inserting plate being vertically extended outwards from the side plate;
   a number of barbed bars being extended from a distal end of the inserting plate;
   a locking plate being vertically extended downwards from a rear end of the inserting plate;
   a number of toothed bars being extended from the locking plate;
   said locking pieces being locked at lower ends of the locking plates;
   each of said locking pieces comprising a connecting portion at the upper position thereof;
   said connecting portion being hollow;
   a number of toothed grooves being defined on an inner wall of the connecting portion;
   a supporting portion being formed at a lower end of the connecting portion;
   said each connector of the four connectors having the same structure;
   said each connector comprising a bottom casing and a top casing;
   said bottom casing comprising a bottom casing main body;
   a first linking portion being located at one side of the bottom casing main body;
   a first fixing plate being vertically extended upwards from the edge of the first linking portion;
   a number of first screw holes being bored on the first fixing plate, which are corresponding to the locking holes of the rim;
   a second linking portion being located at the other side of the bottom casing main body;
   a second fixing plate being vertically extended upwards from the edge of the second linking portion;
   a number of second screw holes being bored on the second fixing plate, which are corresponding to the locking holes of the rim;
   said top casing comprising a top cover;
   a lateral plate being downwards bent and extended from the outer edge of the top cover;
   a sealing strip being pasted at the position of the inner edge of the sealing strip contacting the writable pre-coating layer.

2. The whiteboard according to claim 1, wherein the foaming layer is a layer of XPS foam board.

3. The whiteboard according to claim 1, wherein the back plate is a layer of galvanized steel board.

4. The whiteboard according to claim 1, wherein the end of the top plate, the light filter plate and the end of the upper plate are formed as a single body in one step by melting.

5. The whiteboard according to claim 1, wherein two protruding lugs are vertically extended from the side plate, and a slot is located between the two protruding lugs.

* * * * *

UNITED STATES PATENT AND TRADEMARK OFFICE
CERTIFICATE OF CORRECTION

| | | |
|---|---|---|
| PATENT NO. | : 9,669,650 B2 | Page 1 of 1 |
| APPLICATION NO. | : 14/408960 | |
| DATED | : June 6, 2017 | |
| INVENTOR(S) | : Qian-Xin Shen and Ye-Jun Xiao | |

It is certified that error appears in the above-identified patent and that said Letters Patent is hereby corrected as shown below:

On the Title Page

Item (71), the name of Applicant should read as "LONG YOUNG TECHNOLOGY CO., LTD." rather than "MILLENNIUM TECHNOLOGY ENTERPRISE (SHENZHEN) CO., LTD.".

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*